(12) United States Patent
Oosawa et al.

(10) Patent No.: US 12,258,003 B2
(45) Date of Patent: Mar. 25, 2025

(54) VEHICLE CONTROL APPARATUS

(71) Applicant: SUBARU CORPORATION, Tokyo (JP)

(72) Inventors: Jun Oosawa, Tokyo (JP); Masaki Komuro, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 262 days.

(21) Appl. No.: 17/692,412

(22) Filed: Mar. 11, 2022

(65) Prior Publication Data

US 2022/0314962 A1    Oct. 6, 2022

(30) Foreign Application Priority Data

Mar. 31, 2021   (JP) ................. 2021-059528

(51) Int. Cl.
*B60W 20/40*   (2016.01)
*B60W 10/02*   (2006.01)
*B60W 10/08*   (2006.01)

(52) U.S. Cl.
CPC ............ *B60W 20/40* (2013.01); *B60W 10/02* (2013.01); *B60W 10/08* (2013.01); *B60W 2710/083* (2013.01)

(58) Field of Classification Search
CPC ...... B60W 20/40; B60W 10/02; B60W 10/08; B60W 2710/083; B60W 2510/0657;
(Continued)

(56) References Cited

U.S. PATENT DOCUMENTS 8,550,947 B2 * 10/2013 Kasuya ................. B60W 10/02
475/5
9,415,767 B2 * 8/2016 Maeda ..................... F16H 3/728
(Continued)

FOREIGN PATENT DOCUMENTS

JP          10-98804 A     4/1998
JP       2005-130564 A     5/2005
(Continued)

OTHER PUBLICATIONS

Japanese Office Action issued in Japanese Patent Application No. 2021-059528 dated Dec. 17, 2024, with machine translation.

*Primary Examiner* — Angele Y Ortiz
*Assistant Examiner* — Aaron E Santos
(74) *Attorney, Agent, or Firm* — TROUTMAN PEPPER HAMILTON SANDERS LLP

(57) ABSTRACT

A vehicle control apparatus includes a motor generator, an engine, a transmission mechanism, a clutch mechanism, and a control system configured to control the motor generator, the engine, the transmission mechanism and the clutch mechanism. The control system has a first traveling mode to engage the clutch mechanism and a second traveling mode to disengage the clutch mechanism. The control system is configured to set a shift period based on a transmission gear ratio of the transmission mechanism. The control system is configured to: control, upon switching from the first traveling mode to the second traveling mode, the clutch mechanism to be in a state where the clutch mechanism is engaged for an entirety of the shift period; and under the state where the clutch mechanism is engaged, decrease a torque of the engine and increase a power running torque of the motor generator.

16 Claims, 14 Drawing Sheets

(58) Field of Classification Search
CPC ... B60W 2520/105; B60W 2710/0666; B60W 2710/1005; B60W 10/06; B60W 10/107; B60W 30/19; B60W 30/20; B60W 20/15; B60W 30/182; B60W 2030/203; B60W 20/10; B60K 6/387; B60K 2006/4825

See application file for complete search history.

(56) References Cited

U.S. PATENT DOCUMENTS

| | | | |
|---|---|---|---|
| 10,556,593 B2* | 2/2020 | Ito | B60W 10/02 |
| 11,338,795 B2* | 5/2022 | Komuro | B60W 10/02 |
| 2005/0090366 A1 | 4/2005 | Namba | |
| 2012/0245785 A1 | 9/2012 | Tamagawa | |
| 2014/0025247 A1 | 1/2014 | Tamagawa | |
| 2014/0249709 A1 | 9/2014 | Tamagawa | |
| 2019/0084553 A1* | 3/2019 | Yamamoto | B60K 6/365 |
| 2022/0305901 A1* | 9/2022 | Inoue | B60K 6/52 |
| 2023/0391180 A1* | 12/2023 | Kuji | B60K 6/387 |

FOREIGN PATENT DOCUMENTS

| | | |
|---|---|---|
| JP | 2008-273460 A | 11/2008 |
| JP | 2014-113870 A | 6/2014 |
| JP | 2014-196104 A | 10/2014 |

* cited by examiner

[HEV mode (assist mode)]

[HEV mode (power generation-traveling mode)]

VEHICLE CONTROL APPARATUS

CROSS-REFERENCE TO RELATED APPLICATION

The present application claims priority from Japanese Patent Application No. 2021-059528 filed on Mar. 31, 2021, the entire contents of which are hereby incorporated by reference.

BACKGROUND

The disclosure relates to a vehicle control apparatus configured to control a vehicle.

A hybrid vehicle is equipped with an engine and a motor generator as power sources (see Japanese Unexamined Patent Application Nos. H10-98804, 2005-130564 and 2014-196104). In addition, the hybrid vehicle has, as traveling modes Publication, an electric vehicle (EV) mode to travel using a motor generator, and a hybrid electric vehicle (HEV) mode to travel using an engine and the motor generator.

SUMMARY

An aspect of the disclosure provides a vehicle control apparatus configured to control a vehicle. The vehicle control apparatus includes a motor generator, an engine, a transmission mechanism, a clutch mechanism, and a control system. The motor generator is coupled to a first drive wheel; an engine coupled to at least one of the first drive wheel and a second drive wheel via a power transmission path. The transmission mechanism is disposed in the power transmission path. The clutch mechanism is disposed in the power transmission path between the engine and the transmission mechanism. The control system includes a processor and a memory communicably coupled to each other and configured to control the motor generator, the engine, the transmission mechanism and the clutch mechanism. The control system has a first traveling mode and a second traveling mode. The first traveling mode is to control the clutch mechanism to be in an engagement state, control the engine to be in a driving state and control the motor generator to be in a rotation state. The second traveling mode is to control the clutch mechanism to be in a disengagement state, control the engine to be in a stopped state, and control the motor generator to be in the rotation state. The control system is configured to set a shift period based on a transmission gear ratio of the transmission mechanism. The control system is configured to: control, upon switching from the first traveling mode to the second traveling mode, the clutch mechanism to be in a state where the clutch mechanism is engaged for an entirety of the shift period; and under the state where the clutch mechanism is engaged, decrease a torque of the engine and increase a power running torque of the motor generator.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

When the traveling mode is switched from a HEV mode to an EV mode, an engine is disengaged from wheels to be stopped, and therefore, it is necessary to disengage a clutch between the engine and the wheels. In the case where an engine torque is increased in the HEV mode, a shock may be generated by an excessive torque change upon clutch disengagement for switching the traveling mode. Such a shock may give a sense of discomfort to a driver and therefore, it is desirable to reduce a shock when the traveling mode is switched.

In the following, some embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
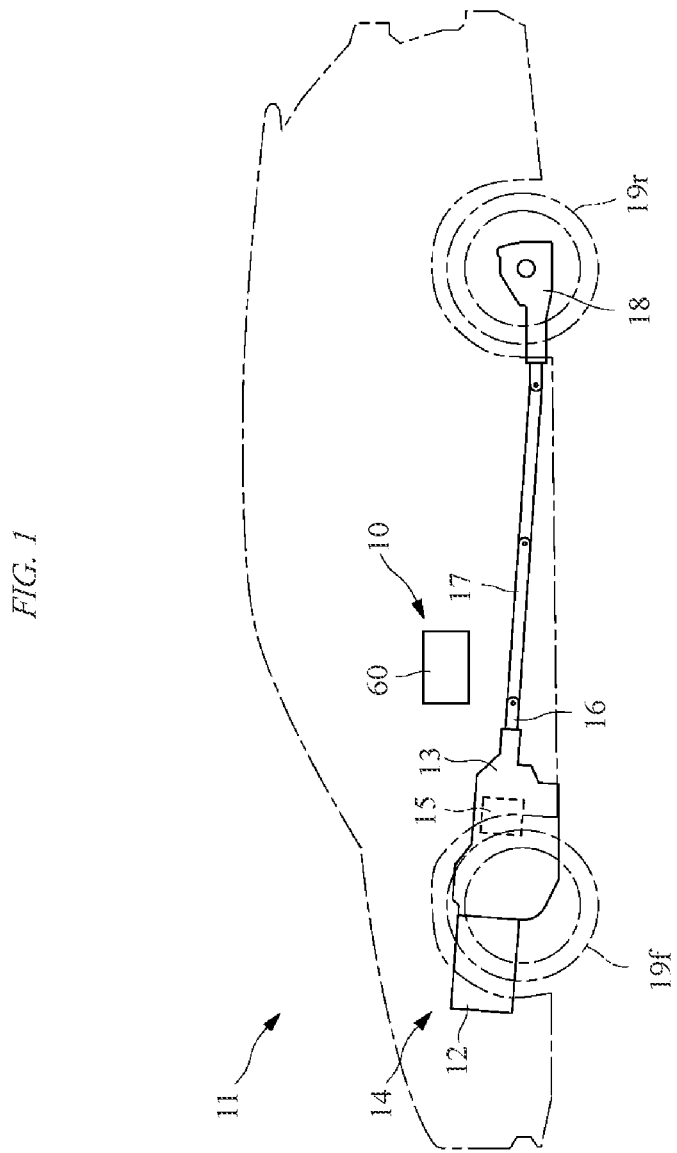
FIG. 1 illustrates a configuration example of a vehicle including a vehicle control apparatus according to an embodiment of the disclosure.

FIG. 1 illustrates a configuration example of a vehicle 11 including a vehicle control apparatus 10 according to an embodiment of the disclosure. As illustrated in FIG. 1, the vehicle 11 is equipped with a power train 14 including an engine 12 and a transmission 13. The illustrated vehicle 11 is a hybrid vehicle, and a motor generator 15 as a power source is mounted on the transmission 13. In addition, an output shaft 16 of the transmission 13 is coupled to rear wheels 19r via a propeller shaft 17 and a differential mechanism 18. The illustrated power train 14 is a power train for rear wheel drive that drives the rear wheels 19r, but the disclosure is not limited thereto. For example, the power train 14 may be a power train for front wheel drive that drives front wheels 19f, or may be a power train for all-wheel-drive that drives both the front wheels 19f and the rear wheels 19r. In one embodiment, each of the rear wheels 19r may serve as a "first drive wheel", and each of the front wheels 19f may server as a "second drive wheel".

Figure 2:
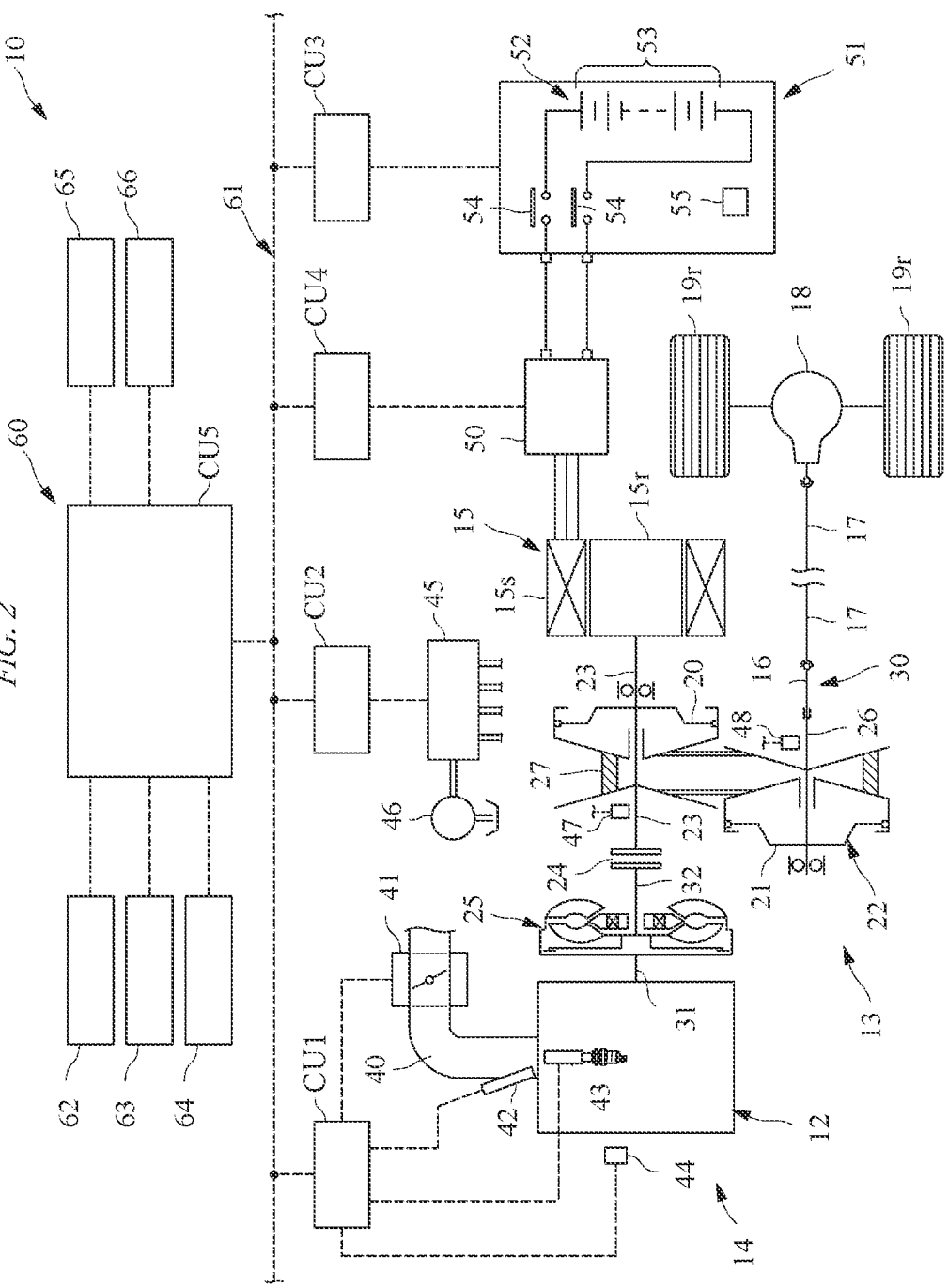
FIG. 2 illustrates a configuration example of the vehicle control apparatus.

FIG. 2 illustrates a configuration example of the vehicle control apparatus 10. As illustrated in FIG. 2, the power train 14 is equipped with a continuously variable transmission mechanism 22 including a primary pulley 20, a secondary pulley 21 and a driving chain 27. The engine 12 is coupled to one side of a primary shaft 23 supporting the primary pulley 20 via a forward clutch 24 and a torque converter 25. In addition, the other side of the primary shaft 23 supporting the primary pulley 20 is coupled to a rotor 15r of the motor generator 15. Further, a secondary shaft 26 supporting the secondary pulley 21 is coupled to the rear wheels 19r via the output shaft 16, the propeller shaft 17 and the differential mechanism 18. In one embodiment, the continuously variable transmission mechanism 22 and the forward clutch 24 may serve as a "transmission mechanism", and "clutch mechanism" respectively.

Note that the forward clutch 24 is a clutch forming part of a forward and reverse switching mechanism.

The engine 12 is coupled to the rear wheels 19r via a power transmission path 30 that includes the torque converter 25, the forward clutch 24, the continuously variable transmission mechanism 22, the propeller shaft 17, the differential mechanism 18 and other components. As illustrated in FIG. 2, the power transmission path 30 includes a crank shaft 31, the torque converter 25, a turbine shaft 32, the forward clutch 24, the primary shaft 23, the continuously variable transmission mechanism 22, the secondary shaft 26, the output shaft 16, the propeller shaft 17, and the differential mechanism 18.

As described above, the forward clutch 24 and the continuously variable transmission mechanism 22 are provided to the power transmission path 30, which couples the engine 12 to the rear wheels 19r. In addition, the forward clutch 24 on the power transmission path 30 is disposed between the engine 12 and the continuously variable transmission mechanism 22. Further, the motor generator 15 is coupled to the primary shaft 23 forming the power transmission path 30. That is, the motor generator 15 is coupled to the rear wheels 19r from an input side of the continuously variable transmission mechanism 22 via the power transmission path 30.

A throttle valve 41 configured to regulate an intake air amount is provided to an intake manifold 40 of the engine 12. In addition, the engine 12 is equipped with an injector 42 that injects a fuel into an intake port or a cylinder, and is also equipped with an ignition device 43 including an ignitor, an ignition plug and other components. Further, the engine 12 is equipped with an engine rotation sensor 44 that detects an engine rotation speed. In addition, to control a torque outputted from the engine 12 (hereinafter, referred to as an engine torque), an engine control unit CU1 that is an electronic control unit is coupled to the components of the engine 12 such as the throttle valve 41, the injector 42, and the ignition device 43.

In order to control the components of the power train 14 such as the forward clutch 24 and the continuously variable transmission mechanism 22, the power train 14 is equipped with a valve unit 45 including multiple solenoid valves, oil passages and other components. In addition, the valve unit 45 is coupled to an oil pump 46 driven by an engine or the like. Hydraulic oil discharged from the oil pump 46 is controlled by the valve unit 45 in terms of the supply destination, the pressure or the like, so that the hydraulic oil is supplied to the forward clutch 24, the continuously variable transmission mechanism 22 and the like. In addition, in order to control an operating state of the forward clutch 24 or the like, the valve unit 45 is coupled to a transmission control unit CU2 that is an electronic control unit.

Note that the transmission control unit CU2 is coupled to a primary rotation sensor 47 that detects a rotation speed of the primary pulley 20 and a secondary rotation sensor 48 that detects a rotation speed of the secondary pulley 21.

A stator 15s of the motor generator 15 is coupled to a battery module 51 via an inverter 50. Multiple battery cells 53 forming a high-voltage battery 52 are mounted on the battery module 51. The battery module 51 further includes components such as main relays 54 that control the connection of the high-voltage battery 52, and a battery sensor 55 that detects charge and discharge currents, a terminal voltage, a temperature and the like. In addition, the battery module 51 is coupled to a battery control unit CU3 that is an electronic control unit. The battery control unit CU3 monitors charge and discharge of the high-voltage battery 52 and controls the main relays 54 and other components. Further, the battery control unit CU3 calculates a state of charge (SOC) of the high-voltage battery 52 based on the charge and discharge currents, the terminal voltage, etc., which are detected by the battery sensor 55. Note that the SOC of the high-voltage battery 52 is a ratio indicating a remaining amount of electricity in the high-voltage battery 52, or a ratio of charged amount to the full charge capacity of the high-voltage battery 52.

The inverter 50 executes energization control of the motor generator 15, and is coupled to a motor control unit CU4 that is an electronic control unit. The motor control unit CU4 controls the inverter 50 including multiple switching elements, thereby controlling a motor torque outputted from the motor generator 15. Note that the motor torque of the motor generator 15 includes a power running torque outputted from the motor generator 15 in a power running state, and a power generation torque outputted from the motor generator 15 in a power generation state. The direction of action of the power running torque is opposite to the direction of action of the power generation torque. For controlling the motor generator 15 to be in the power running state, DC power from the high-voltage battery 52 is converted into AC power via the inverter 50, and supplied to the stator 15s. For controlling the motor generator 15 to be in the power generation state, AC power from the stator 15s is converted into DC power via the inverter 50, and supplied to the high-voltage battery 52.

As illustrated in FIG. 2, the vehicle control apparatus 10 is equipped with a control system 60 that includes multiple electronic control units to control the power train 14. The electronic control units forming the control system 60 include the above-described engine control unit CU1, transmission control unit CU2, battery control unit CU3 and motor control unit CU4. The electronic control units forming the control system 60 further include a vehicle control unit CU5 that outputs control signals to each of the control units CU1 to CU4. These control units CU1 to CU5 are communicably coupled to one another via an in-vehicle network 61 such as controller area network (CAN). The vehicle control unit CU5 sets an operation target of the power train 14 based on information inputted from the control units CU1 to CU4 and later-described various sensors. Then, the vehicle control unit CU5 generates control signals according to the operation target of the power train 14 and outputs these control signals to the control units.

Examples of the various sensors coupled to the vehicle control unit CU5 include a vehicle speed sensor 62 that detects a vehicle speed as a traveling speed of the vehicle 11, an accelerator sensor 63 that detects an operation amount of an accelerator pedal, and a brake sensor 64 that detects an operation amount of a brake pedal. In addition, the vehicle control unit CU5 is coupled to an acceleration rate sensor 65 that detects a vehicle acceleration rate acting in a frontward or backward of the vehicle 11. Further, the vehicle control unit CU5 is coupled to a start switch 66 that is operated by a driver who drives the vehicle 11 at the time of activating the control system 60.

Figure 3:
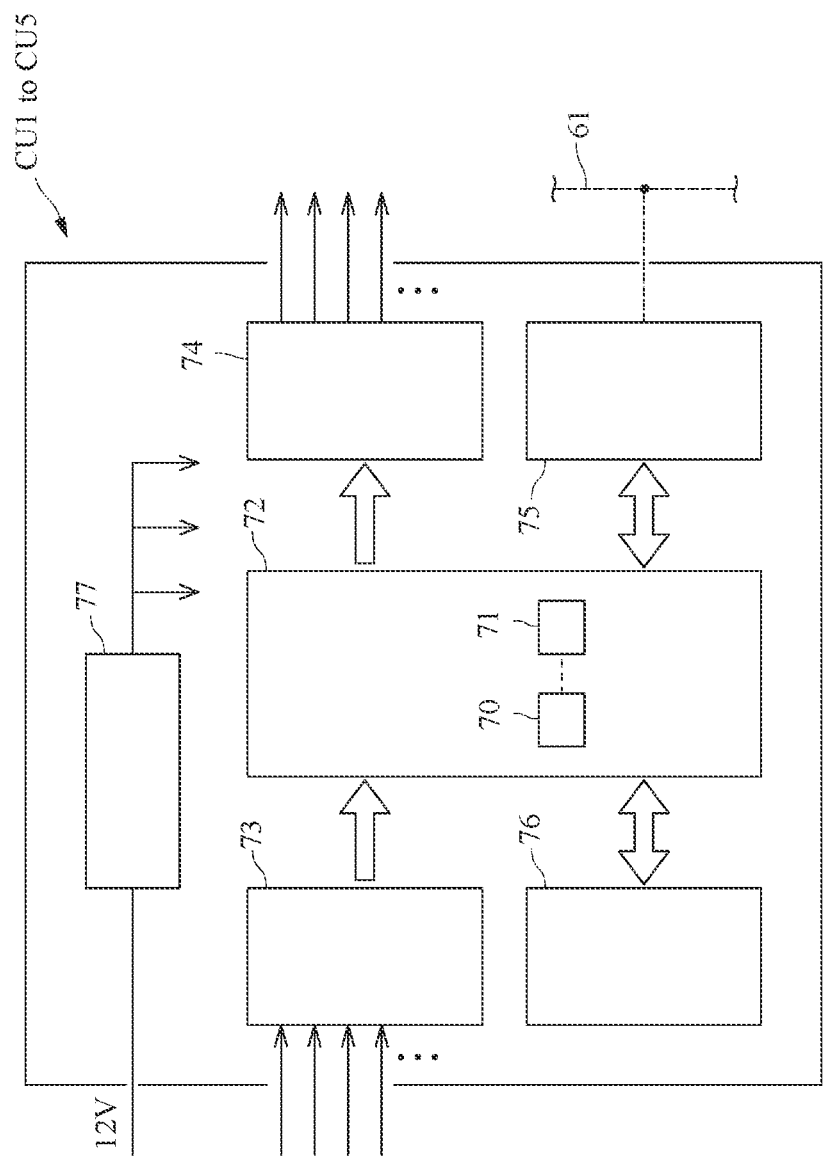
FIG. 3 simply illustrates a basic structure of each control unit.

FIG. 3 simply illustrates a basic structure of each of the control units CU1 to CU5. As illustrated in FIG. 3, each of the control units CU1 to CU5 includes a micro controller 72 that includes components such as a processor 70 and a memory 71. The memory 71 stores a predetermined program, and the processor 70 executes a set of instructions of the program. The processor 70 and the memory 71 are communicably coupled to each other. In the illustrated example, the micro controller 72 includes one processor 70 and one memory 71, but the disclosure is not limited thereto. The micro controller 72 may include multiple processors 70, and it may include multiple memories 71.

In addition, each of the control units CU1 to CU5 is equipped with various circuits such as an input conversion circuit 73, a drive circuit 74, a communication circuit 75, an external memory 76, and a power circuit 77. The input conversion circuit 73 converts signals inputted from various sensors into signals that can be inputted into the micro controller 72. The drive circuit 74 generates a drive signal to an actuator such as the above-described valve unit 45 based on the signal outputted from the micro controller 72. The communication circuit 75 converts the signal outputted from the micro controller 72 into a communication signal to be outputted to other control units. In addition, the communication circuit 75 converts a communication signal received from another control unit into a signal that can be inputted into the micro controller 72. Further, the power circuit 77 supplies a stable power source voltage to the micro controller 72, the input conversion circuit 73, the drive circuit 74, the communication circuit 75, the external memory 76 or the like. The external memory 76 such as a non-volatile memory stores data that should be held during non-energization.

Figure 4:
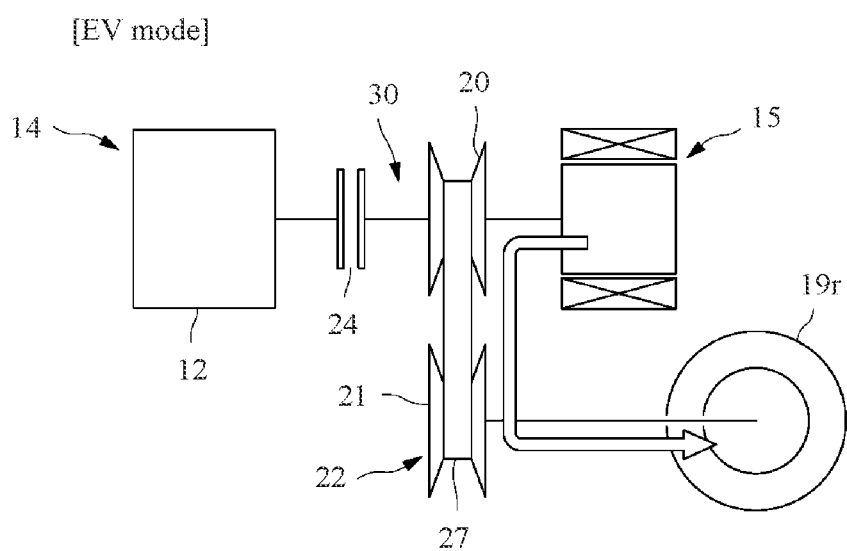
FIG. 4 illustrates a state of executing an EV mode.
Figure 5A:
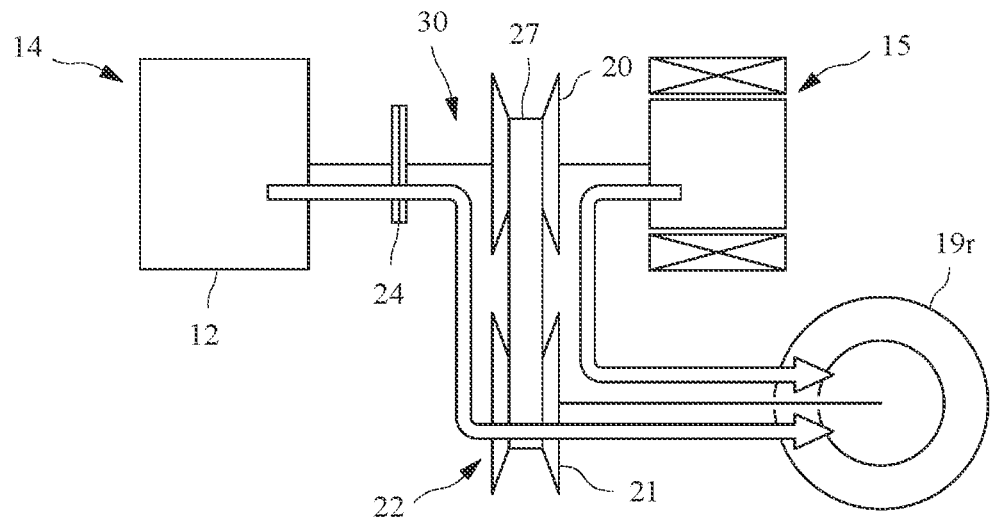
FIG. 5A illustrates a state of executing a HEV mode.
Figure 5B:
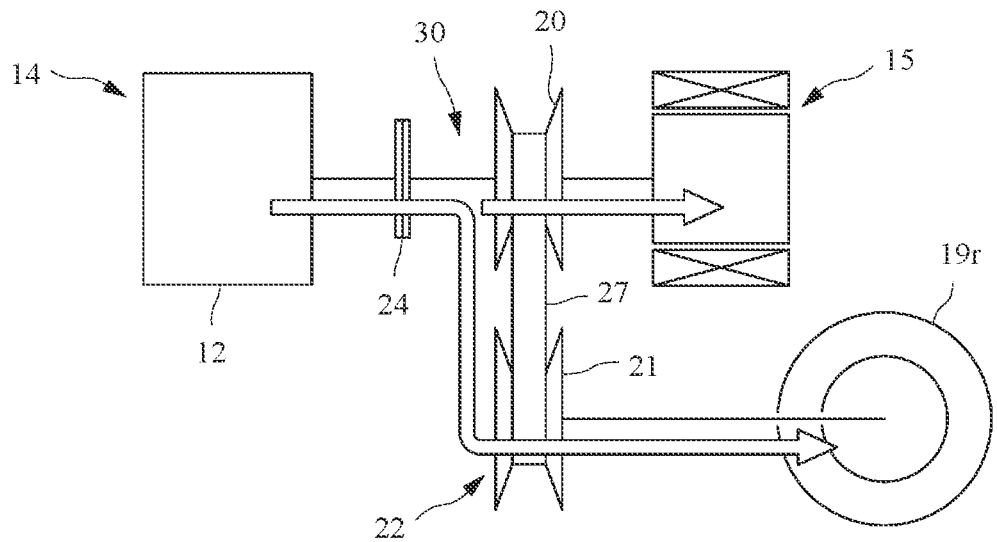
FIG. 5B illustrates a state of executing a HEV mode.

FIG. 4 illustrates a state of executing an electric vehicle (EV) mode, and FIGS. 5A and 5B each illustrate a state of executing a hybrid electric vehicle (HEV) mode. The control system 60 has, as traveling modes, the EV mode and the HEV mode. As described later, the EV mode is a traveling mode in which the engine 12 is stopped and the motor generator 15 is operated, and the HEV mode is a traveling mode in which the engine 12 and the motor generator 15 are operated. In one embodiment, the HEV mode may be referred to a "first traveling mode" and the EV mode may be referred to a "second traveling mode".

As illustrated in FIG. 4, for executing the EV mode, the control system 60 controls the forward clutch 24 to be in a disengagement state, controls the engine 12 to be in a stopped state, and controls the motor generator 15 to be in a power running state that may be referred to as a rotation state. This enables a power running torque to be transmitted to the rear wheels 19r as indicated by a hollow arrow in FIG. 4, which allows the vehicle 11 to travel with the motor generator 15. For decelerating the vehicle 11, the control system 60 controls the motor generator 15 to be in a regenerative power generation state, whereby kinetic energy of the vehicle 11 is converted into electrical energy and stored in the high-voltage battery 52.

In addition, the control system 60 has, as the HEV mode, an assist mode to control the motor generator 15 to be in the power running state and a power generation-traveling mode to control the motor generator 15 to be in the power generation state. As illustrated in FIG. 5A, for executing the assist mode, the control system 60 controls the forward clutch 24 to be in an engagement state, controls the engine 12 to be in a driving state, and controls the motor generator 15 to be in the power running state (rotation state). This enables the engine torque and the power running torque to be transmitted to the rear wheels 19r as indicated by hollow arrows in FIG. 5A, which allows the vehicle 11 to travel with the engine 12 and the motor generator 15. For decelerating the vehicle 11, the control system 60 controls the motor generator 15 to be in the regenerative power generation state, whereby kinetic energy of the vehicle 11 is converted into electrical energy and stored in the high-voltage battery 52.

As illustrated in FIG. 5B, for executing the power generation-traveling mode, the control system 60 controls the forward clutch 24 to be in the engagement state, controls the engine 12 to be in the driving state, and controls the motor generator 15 to be in the power generation state (rotation state). This enables the engine torque to be transmitted to the rear wheels 19r and also to the motor generator 15 as indicated by hollow arrows in FIG. 5B. That is, while the engine torque is used to operate the motor generator 15 in the power generation state, the engine torque is also used to allow the vehicle 11 to travel.

Figure 6:
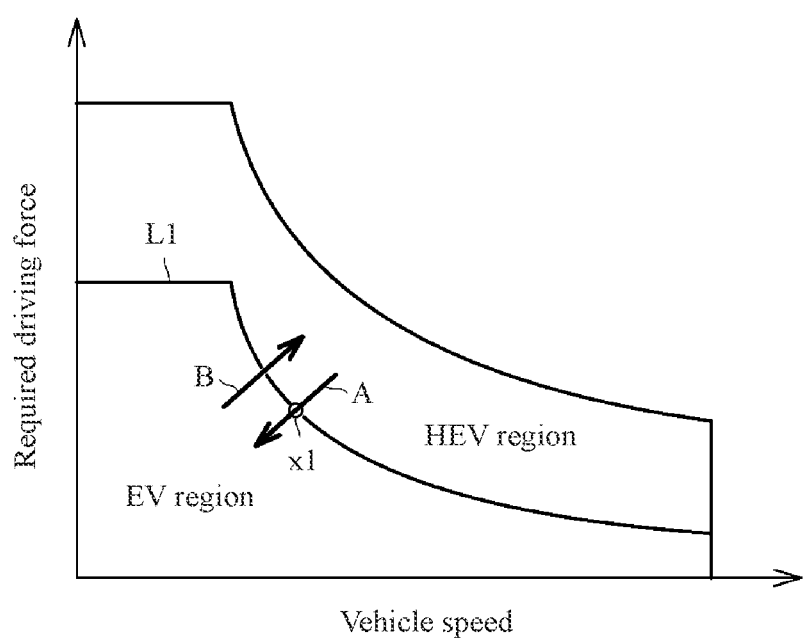
FIG. 6 is a traveling mode map illustrating an example of regions for executing the EV and HEV modes.

FIG. 6 is a traveling mode map illustrating an example for regions of executing the EV and HEV modes. As illustrated in FIG. 6, the traveling mode map has a boundary line L1 between a region of executing the EV mode and a region of executing HEV mode. Note that a required driving force illustrated in FIG. 6 is a driving force required for the power train 14 by the control system 60. The control system 60 can set the required driving force based on, for example, an accelerator opening that is the operation amount of the accelerator pedal. That is, as the accelerator opening is increased, a larger required driving force is set, and as the accelerator opening is decreased, a smaller required driving force is set.

When the required driving force or the vehicle speed is decreased so as to be below the boundary line L1 in the HEV mode, as illustrated by an arrow A in FIG. 6, the control system 60 switches the traveling mode from the HEV mode to the EV mode. That is, in the case of traveling in the assist mode, the assist mode is switched to the EV mode, and in the case of traveling in the power generation-traveling mode, the power generation-traveling mode is switched to the EV mode. On the other hand, when the required driving force or the vehicle speed is increased above the boundary line L1 in the EV mode, as indicated by an arrow B in FIG. 6, the traveling mode is switched from the EV mode to the HEV mode.

As described above, the HEV mode includes the assist mode and the power generation-traveling mode, and which of the assist mode and the power generation-traveling mode is to be executed is determined based on the SOC of the high-voltage battery 52 or the like. For example, when the required driving force or the vehicle speed is increased above the boundary line L1 and the SOC of the high-voltage battery 52 is higher than a predetermined value, the traveling mode is switched from the EV mode to the assist mode. When the required driving force or the vehicle speed is increased above the boundary line L1 and the SOC of the high-voltage battery 52 is below the predetermined value, the traveling mode is switched from the EV mode to the power generation-traveling mode.

Figure 7:
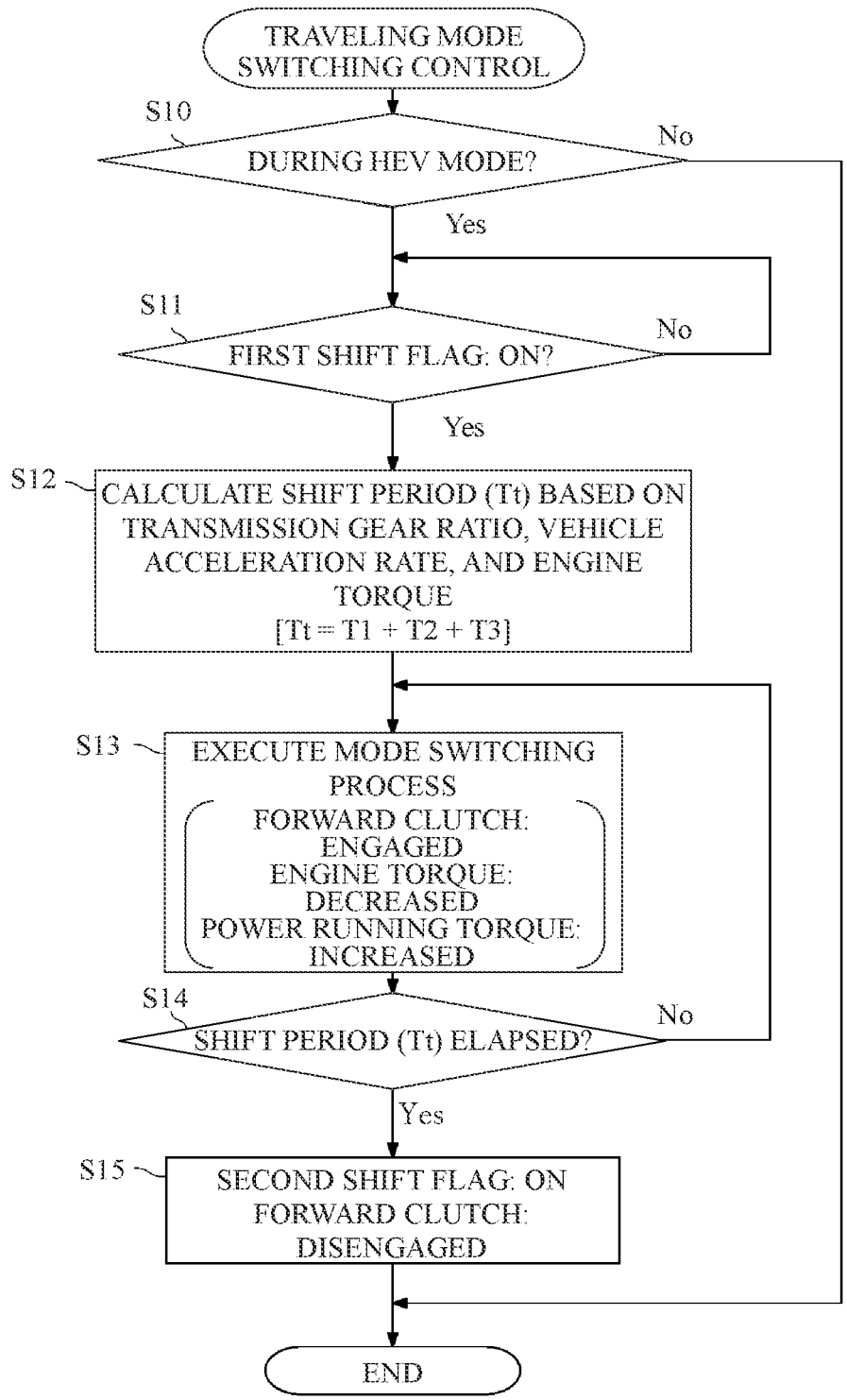
FIG. 7 is a flowchart indicating an example of a procedure for executing traveling mode switching control.
Figure 8:
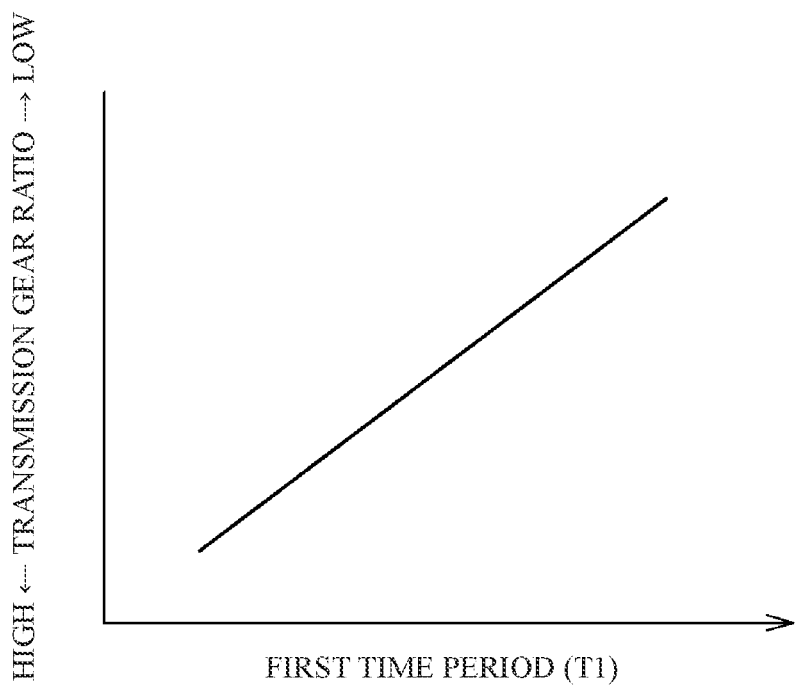
FIG. 8 illustrates an example of relationship between a transmission gear ratio and a first time period.
Figure 9:
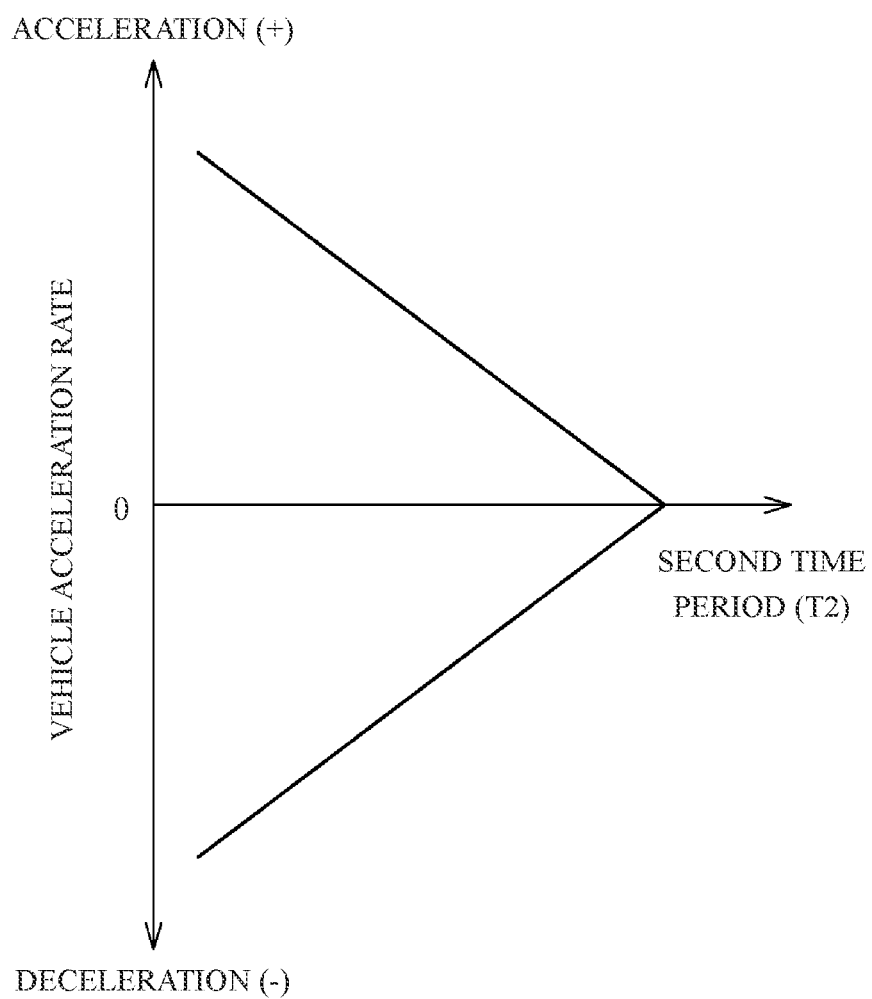
FIG. 9 illustrates an example of relationship between a vehicle acceleration rate and a second time period.
Figure 10:
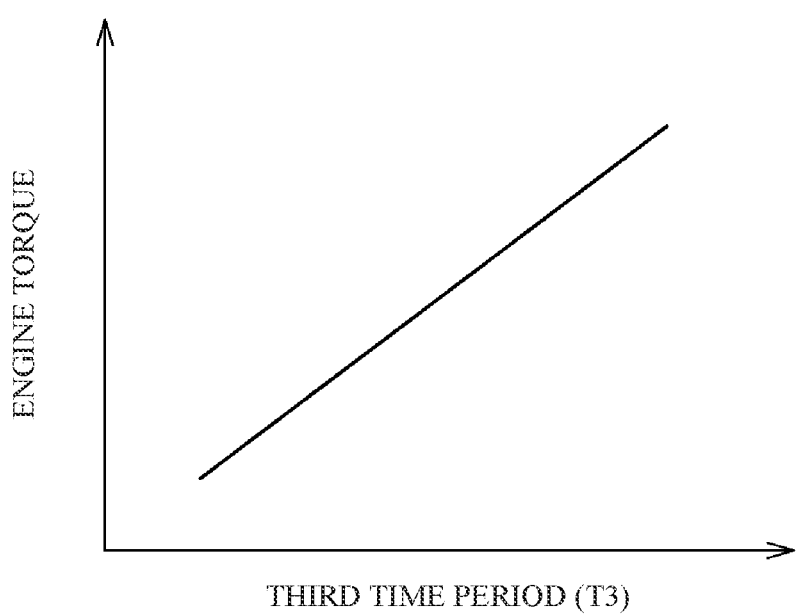
FIG. 10 illustrates an example of relationship between an engine torque and a third time period.

Next, traveling mode switching control for switching the traveling mode from the HEV mode to the EV mode will be described. FIG. 7 is a flowchart illustrating an example of a procedure for executing the traveling mode switching control. FIG. 8 illustrates an example of a relationship between a transmission gear ratio and a first time period T1. FIG. 9 illustrates an example of a relationship between the vehicle acceleration rate and a second time period T2. FIG. 10 illustrates an example of a relationship between the engine torque and a third time period T3. Note that each step in the flowchart of FIG. 7 illustrates processing to be executed by one or multiple processors 70 forming the control system 60. Further, the traveling mode switching control illustrated in FIG. 7 is executed by the control system 60 at every predetermined cycle after the start switch 66 is operated by the driver of the vehicle 11 to activate the control system 60 including the vehicle control unit CU5 and others.

Referring to FIG. 7, in step S10, the control system 60 determines whether the HEV mode is being executed. That is, in step S10, the control system 60 determines whether the assist mode or the power generation-traveling mode is being executed. When it is determined in step S10 that the HEV mode is being executed, the flow proceeds to step S11 where the control system 60 determines whether a first shift flag is set to an ON state. Here, the first shift flag is a control flag that is set to the ON state when the switching from the HEV mode to EV mode is confirmed. That is, the first shift flag is set to the ON state at the timing when the traveling state of the vehicle 11 falls below the boundary line L1 by a reduction in the required driving force or the vehicle speed in the HEV mode, as illustrated by a symbol x1 in FIG. 6.

When it is determined in step S11 that the first shift flag is set to the ON state, the flow proceeds to step S12 where the control system 60 sets a shift period Tt. In step S12, the control system 60 sets the first time period T1, the second time period T2 and the third time period T3 based on the transmission gear ratio, the vehicle acceleration rate and the engine torque, and then sets the shift period Tt by adding these time periods T1, T2 and T3. Referring to FIG. 8, as the transmission gear ratio of the continuously variable transmission mechanism 22 goes to a low side, the first time period T1 forming the shift period Tt is set longer. In addition, referring to FIG. 9, as the vehicle acceleration rate changes further toward an acceleration side (plus side), the second time period T2 is set shorter, and as the vehicle acceleration rate changes further toward a deceleration side (minus side), the second time period T2 is set shorter. That is, referring to FIG. 9, as the absolute value of the vehicle acceleration rate becomes smaller, the second time period T2 forming the shift period Tt is set longer. Further, referring to FIG. 10, as the engine torque becomes larger, the third time period T3 forming the shift period Tt is set longer.

The transmission gear ratio of the continuously variable transmission 22 is calculated by the transmission control unit CU2, the engine torque is calculated by the engine control unit CU1, and the vehicle acceleration rate is detected by the acceleration rate sensor 65. The transmission gear ratio of the continuously variable transmission mechanism 22 is a ratio of an output rotation speed to an input rotation speed, that is a ratio of a rotation speed of the primary shaft 23 to a rotation speed of the secondary shaft 26. In other words, a change of the transmission gear ratio to a low side means that the value of the transmission gear ratio becomes larger, while a change of the transmission gear ratio to a high side means that the value of the transmission gear ratio becomes smaller.

Referring to FIG. 7, when the shift period Tt is set in step S12, the flow proceeds to step S13 where the control system 60 executes a mode switching process. In step S13, the control system 60 controls the forward clutch 24 to be in the engagement state, decreases the engine torque, and increases the power running torque of the motor generator 15. Then, the flow proceeds to step S14 where the control system 60 determines whether the shift period Tt has elapsed from the start of the mode switching process. If it is determined in step S14 that the shift period Tt has not elapsed, the flow returns to step S13 where the control system 60 continues to execute the mode switching process. On the other hand, if it is determined in step S14 that the shift period Tt has elapsed, the flow proceeds to step S15 where the control system 60 controls the forward clutch 24 to be in the disengagement state and sets a second shift flag to an ON state that indicates completion of switching to the EV mode.

In this way, the control system 60 sets the shift period Tt based on the transmission gear ratio, the vehicle acceleration rate and the engine torque, and executes the mode switching process over the shift period Tt, thereby switching the traveling mode from the HEV mode to the EV mode. In other words, the forward clutch 24 is controlled to be in the engagement state over the shift period Tt set based on the transmission gear ratio, the vehicle acceleration rate and the engine torque. Then, under the engagement state of the forward clutch 24, the engine torque is decreased and the power running torque of the motor generator 15 is increased. This can reduce a shock at the time of disengaging the forward clutch 24, thus switching from the HEV mode to the EV mode without giving a sense of discomfort to the driver of the vehicle 11.

Figure 11:
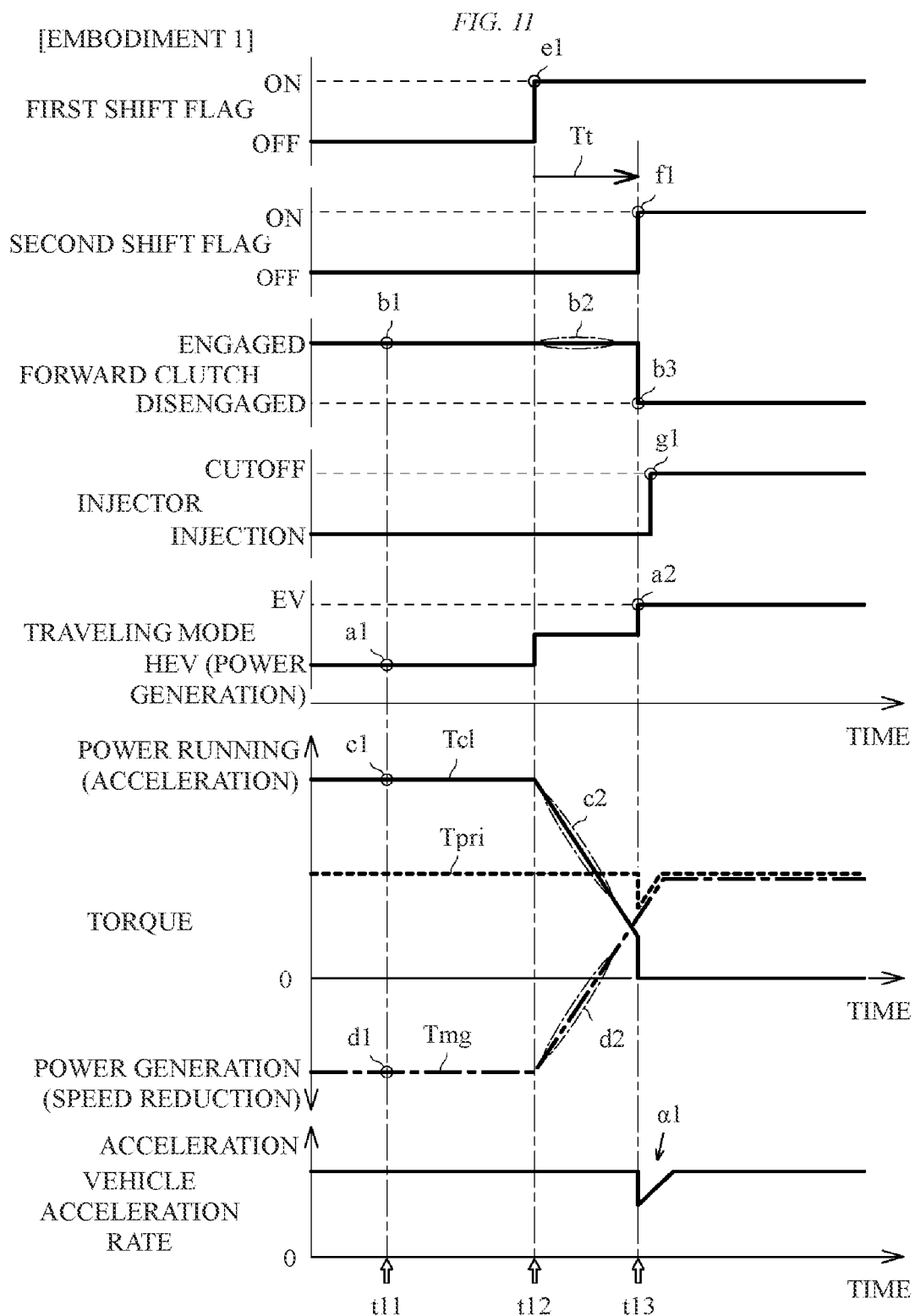
FIG. 11 is a timing chart illustrating a state of executing traveling mode switching control according to an embodiment of the disclosure.

Next, the above-described traveling mode switching control will be described as Embodiment 1 in line with a timing chart. FIG. 11 is a timing chart illustrating a state of executing the traveling mode switching control as Embodiment 1. In FIG. 11, "Tcl" is a clutch torque transmitted by the forward clutch 24, "Tpri" is an input torque to the primary pulley 20, and "Tmg" is the motor torque (the power running torque or the power generation torque).

As illustrated in FIG. 11, the power generation-traveling mode of the HEV mode is executed (symbol a1) at time t11. Accordingly, the forward clutch 24 is controlled to be in the engagement state (symbol b1), the engine torque, or the clutch torque, Tcl is increased (symbol c1), and the motor torque Tmg is increased to the power generation side (symbol d1). Subsequently, when the first shift flag is set to the ON state (symbol e1) as indicated at time t12, the engine torque or clutch torque Tcl is decreased (symbol c2) and the motor torque Tmg is increased to the power running side (symbol d2) with the forward clutch 24 being controlled in the engagement state (symbol b2). Since the example illustrated in FIG. 11 is in the power generation-traveling mode, as indicated by symbol d2, the power generation torque of the motor generator 15 is decreased and then, the power running torque of the motor generator 15 is increased.

Next, when the second shift flag is set to the ON state (symbol f1) as indicated at time t13 after the shift period Tt has elapsed, the forward clutch 24 is controlled to be in the disengagement state (symbol b3) and the traveling mode is switched to the EV mode (symbol a2). In addition, when the forward clutch 24 is controlled to be in the disengagement state (symbol b3), the injector 42 is controlled to be in a fuel cutoff state (symbol g1).

In this way, over the shift period Tt, the forward clutch 24 is engaged, the engine torque is decreased, and the power running torque of the motor generator 15 is increased. This can sufficiently reduce the engine torque or clutch torque Tcl when the forward clutch 24 is disengaged, and thus reduce a disengagement shock of the forward clutch 24. In addition, since the power running torque of the motor generator 15 is increased, an excessive change in the vehicle acceleration rate can be prevented as indicated by arrow a1, even in the case where the engine torque is decreased. This enables switching of the traveling mode without giving a sense of discomfort to the driver of the vehicle 11.

Further, referring to FIG. 8, as the transmission gear ratio of the continuously variable transmission mechanism 22 goes to the low side, the shift period Tt for reduction of the engine torque is set longer. The situation where the continuously variable transmission mechanism 22 is controlled to be in the low side is a situation where the engine torque is amplified and transmitted to the rear wheels 19*r*, and it is also a situation where blocking of the engine torque associated with the clutch disengagement can easily change the vehicle acceleration rate. In this traveling situation, setting the shift period Tt longer enables a sufficient reduction of the engine torque, reducing the disengagement shock of the forward clutch 24. This enables switching of the traveling mode without giving a sense of discomfort to the driver of the vehicle 11.

In addition, referring to FIG. 9, as the absolute value of the vehicle acceleration rate becomes smaller, the shift period Tt for decreasing the engine torque is set longer. When the absolute value of the vehicle acceleration rate is small, a change in the vehicle acceleration rate associated with the clutch disengagement can easily give a sense of discomfort to the driver of the vehicle 11.

In this traveling situation, setting the shift period Tt longer can sufficiently reduce the engine torque, and thus reduce a change in the vehicle acceleration rate associated with the clutch disengagement. This enables switching of the traveling mode without giving a sense of discomfort to the driver of the vehicle 11.

Further, as illustrated in FIG. 10, the shift period Tt for decreasing the engine torque is set longer as the engine torque becomes larger. When the engine torque is large, blocking of the engine torque caused by the clutch disengagement can easily change the vehicle acceleration rate. In this traveling situation, setting the shift period Tt longer can sufficiently reduce the engine torque, and thus reduce the disengagement shock of the forward clutch 24. This enables switching of the traveling mode without giving a sense of discomfort to the driver of the vehicle 11.

In Embodiment 1 illustrated in FIG. 11, the engine torque and the motor torque are controlled so as to keep the vehicle acceleration rate constant, so as to keep the input torque Tpri to the primary pulley 20 constant, but the disclosure is not limited thereto. For example, the engine torque and the motor torque may be controlled so as to increase the vehicle acceleration rate, and the engine torque and the motor torque may be controlled so as to decrease the vehicle acceleration rate.

Figure 12:
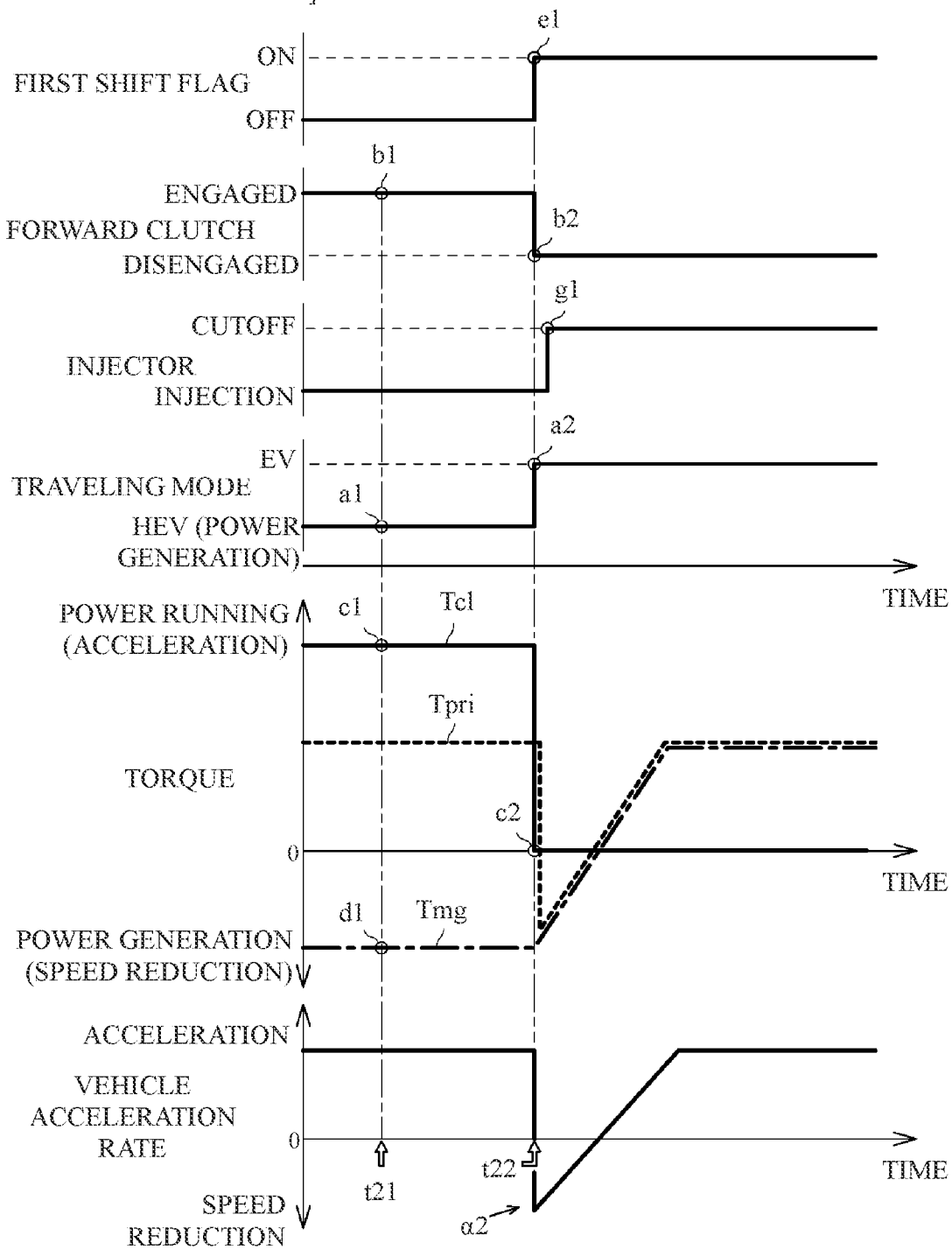
FIG. 12 is a timing chart illustrating a state of executing traveling mode switching control according to a comparative example.

FIG. 12 is a timing chart illustrating a state of executing traveling mode switching control as Comparative Embodiment. As illustrated in FIG. 12, the power generation-traveling mode of the HEV mode is executed (symbol a1) at time t21. Accordingly, the forward clutch 24 is controlled to be in the engagement state (symbol b1), the engine torque, or the clutch torque, Tcl is increased (symbol c1), and the motor torque Tmg is increased to the power generation side (symbol d1). Subsequently, when the first shift flag is set to the ON state (symbol e1) as indicated at time t22, the forward clutch 24 is controlled to be in the disengagement state (symbol b2) and the traveling mode is switched to the EV mode (symbol a2). In addition, when the forward clutch 24 is controlled to be in the disengagement state (symbol b2), the injector 42 is controlled to be in the fuel cutoff state (symbol g1).

In this manner, when the forward clutch 24 is controlled to be in the disengagement state following the ON setting of the first shift flag without controlling the engine torque and the motor torque during the shift period Tt, the clutch disengagement causes a sudden decrease in the clutch torque Tcl (symbol c2). Thus, the clutch disengagement causes a sudden change in the vehicle acceleration rate as indicated by arrow α2, and therefore, a serious sense of discomfort is given to the driver of the vehicle 11 along with the switching of the traveling mode. On the contrary, as Embodiment 1, when the engine torque and the motor torque are controlled during the shift period Tt, an excessive change in the vehicle acceleration rate can be prevented as indicated by arrow α1 in FIG. 11, and thereby, the traveling mode can be switched without giving a sense of discomfort to the driver.

Figure 13:
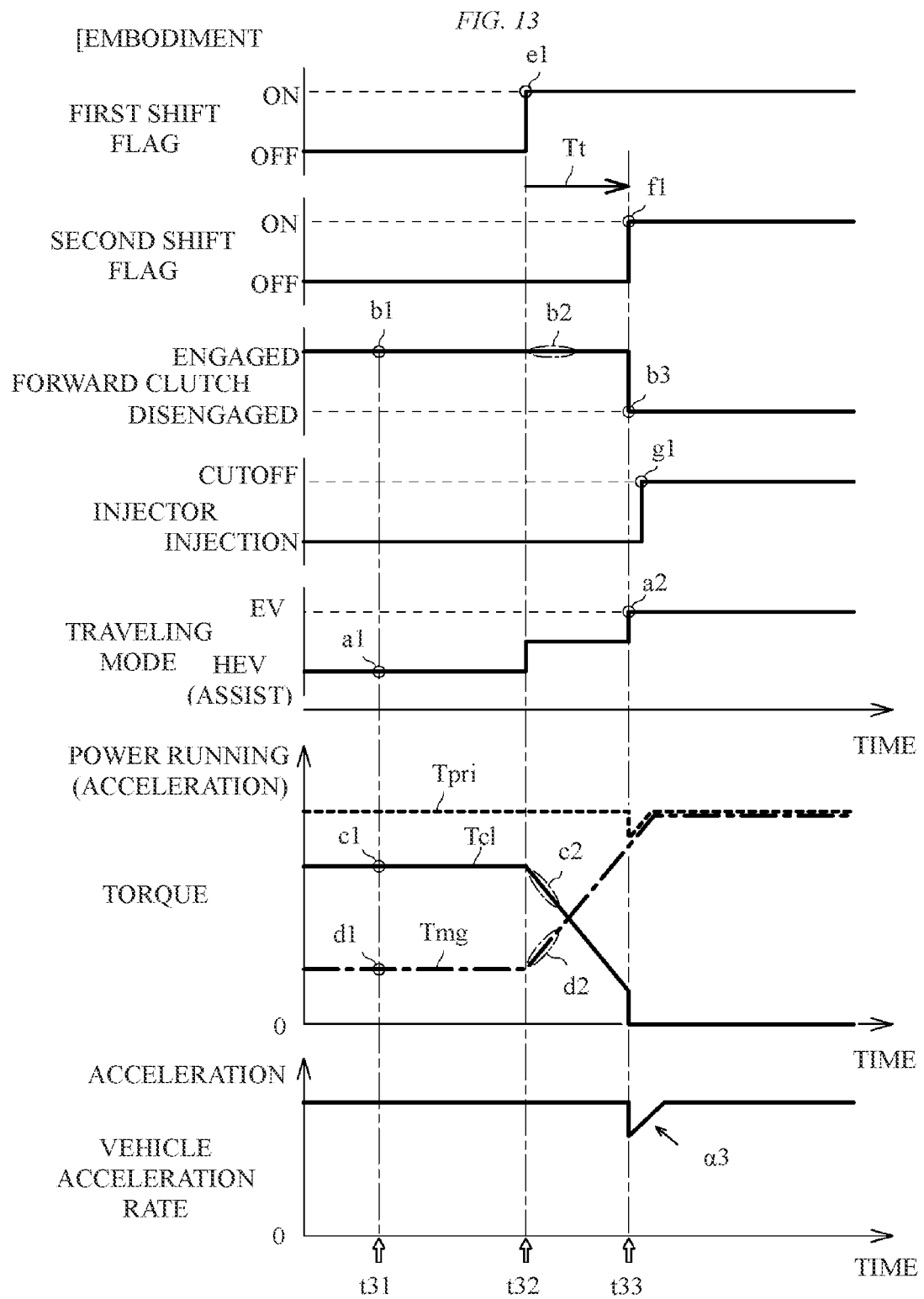
FIG. 13 is a timing chart illustrating a state of executing traveling mode switching control according to an embodiment of the disclosure.

In the embodiment illustrated in FIG. 11, the traveling mode is switched from the power generation-traveling mode to the EV mode, but the disclosure is not limited thereto. The traveling mode may be switched from the assist mode to the EV mode. FIG. 13 is a timing chart illustrating a state of executing traveling mode switching control as Embodiment 2.

As illustrated in FIG. 13, the assist mode of the HEV mode is executed at time t31 (symbol a1). Accordingly, the forward clutch 24 is controlled in the engagement state (symbol b1), the engine torque, or the clutch torque, Tcl is increased (symbol c1), and the motor torque Tmg is increased to the power running side (symbol d1). Subsequently, when the first shift flag is set to the ON state (symbol e1) as indicated at time t32, the engine torque or the clutch torque Tcl is decreased (symbol c2) and the motor torque Tmg is increased to the power running side (symbol d2) while the forward clutch 24 is controlled to be in the engagement state (symbol b2). Next, as indicated at time t33, when the shift period Tt elapses and then the second shift flag is set to the ON state (symbol f1), the forward clutch 24 is controlled to be in the disengagement state (symbol b3) and the traveling mode is switched to the EV mode (symbol a2). In addition, when the forward clutch 24 is controlled to be in the disengagement state (symbol b3), the injector 42 is controlled to be in the fuel cutoff state (symbol g1).

In this way, over the shift period Tt, the forward clutch 24 is engaged, the engine torque is decreased, and the power running torque of the motor generator 15 is increased. This can sufficiently reduce the engine torque or the clutch torque Tcl when the forward clutch 24 is disengaged, and thus reduce the disengagement shock of the forward clutch 24. In addition, since the power running torque of the motor generator 15 is increased, an excessive change in the vehicle acceleration rate can be prevented as indicated by arrow a3, even in the case where the engine torque is decreased. This enables switching of the traveling mode without giving a sense of discomfort to the driver of the vehicle 11. Note that in the embodiment illustrated in FIG. 13, the shift period Tt is also set based on the transmission gear ratio, the vehicle acceleration rate and the engine torque.

Figure 14:
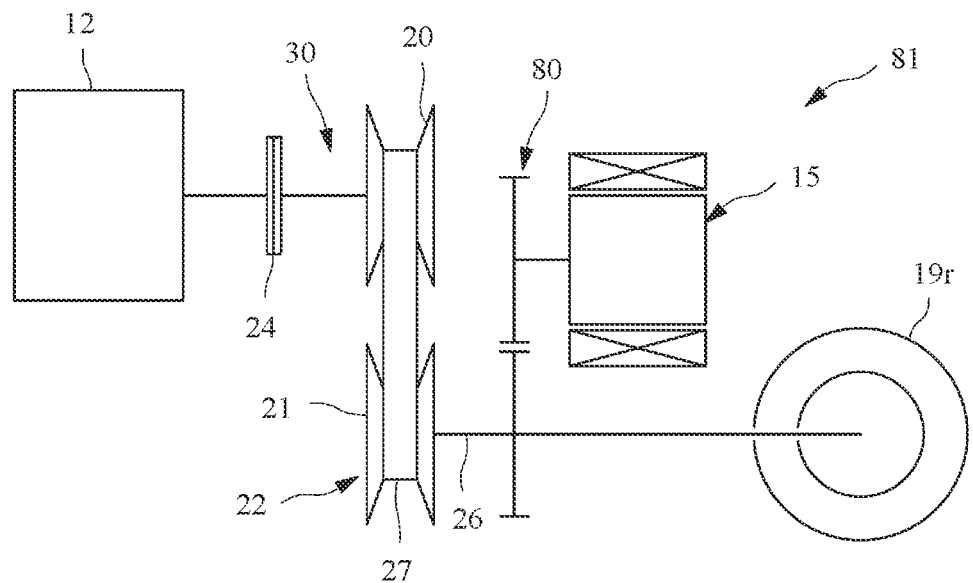
FIG. 14 illustrates a configuration example of a power train.
Figure 15:
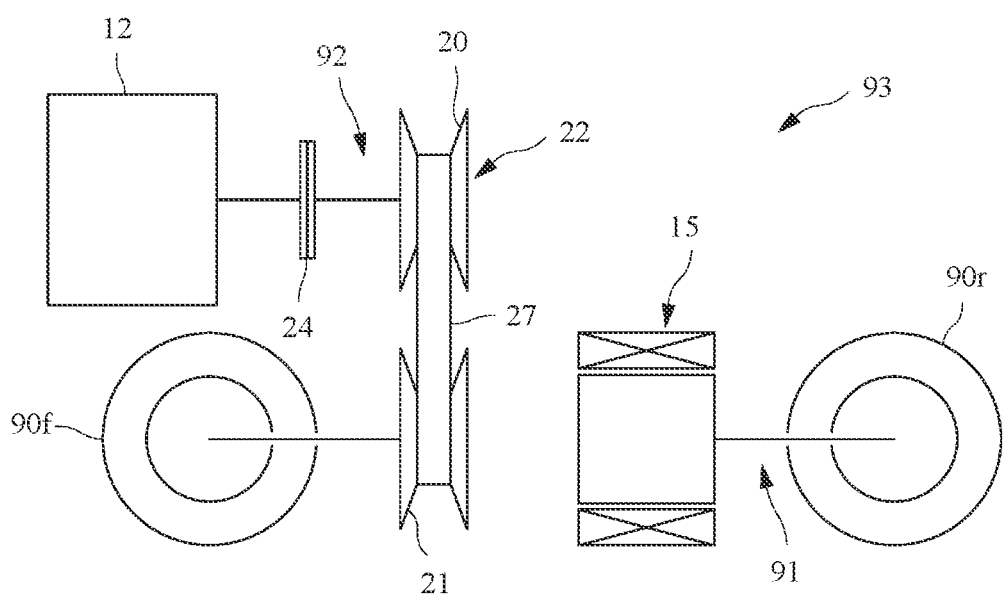
FIG. 15 illustrates a configuration example of the power train.

The configuration of the power train 14 is not limited to the configuration illustrated in FIG. 2, and a power train equipped with a vehicle control apparatus according to the disclosure may have another configuration. FIGS. 14 and 15 illustrate other configuration examples of the power train.

As illustrated in FIG. 14, the engine 12 and the rear wheels 19r are coupled to each other via the power transmission path 30 including a rotation shaft and other components. The power transmission path 30 coupling the engine 12 to the rear wheels 19r includes the forward clutch 24 and the continuously variable transmission mechanism 22. In addition, the forward clutch 24 is disposed between the engine 12 and the continuously variable transmission mechanism 22. Further, the secondary shaft 26 forming the power transmission path 30 is coupled to the motor generator 15 via a gear train 80. The motor generator 15 is coupled to the rear wheels 19r from an output side of the continuously variable transmission mechanism 22 via the power transmission path 30. A vehicle control apparatus according to the disclosure can control an illustrated power train 81 of this type in the same manner as the above-described vehicle control apparatus 10. In the above example illustrated in FIG. 14 or FIG. 4, the engine 12 and the motor generator 15 are coupled to the rear wheels 19r, but the disclosure is not limited thereto. For example, the engine 12 and the motor generator 15 may be coupled to the front wheels 19r illustrated in FIG. 1. In one embodiment, each of the front wheels 19f may serve as a "first drive wheel" and each of the rear wheels 19r may serve as a "second drive wheel".

As illustrated FIG. 15, the motor generator 15 is coupled to the rear wheels 90r via a power transmission path 91. In addition, the engine 12 is coupled to the front wheels 90f via a power transmission path 92 composed of a rotation shaft and others. In one embodiment, each of the rear wheels 90r may serve as a "first drive wheel", and each of the front wheels 90f may serve as a "second drive wheel". The power transmission path 92 for coupling the engine 12 to the front wheels 90f includes the forward clutch 24 and the continuously variable transmission mechanism 22. In addition, the forward clutch 24 on the power transmission path 92 is disposed between the engine 12 and the continuously variable transmission mechanism 22. That is, in an illustrated power train 93, the engine 12 is coupled to the front wheels 90f and the motor generator 15 is coupled to the rear wheels 90r. A vehicle control apparatus according to the disclosure can control the power train 93 of this type in the same manner as the above-described vehicle control apparatus 10. Further, a power train equipped with a vehicle control apparatus according to the disclosure may have a configuration, in which the engine 12 is coupled to the rear wheels 90r while the motor generator 15 is coupled to the front wheels 90f. In one embodiment, each of the front wheels 90f may serve as a "first drive wheel" and each of the rear wheels 90r may serve as a "second drive wheel". In addition, a so-called in-wheel motor provided inside a hub of the front wheel 90f or the rear wheel 90r may be used as the motor generator 15.

The embodiments of the disclosure are not limited to the above and various modifications may be made without departing from the technical scope of the disclosure. In the above description, the control system 60 includes the multiple control units CU1 to CU5, but the disclosure is not limited thereto. For example, the control system 60 may use one control unit. In addition, in the above description, the continuously variable transmission mechanism 22 including the pulleys 20 and 21 in pairs are used as a transmission mechanism disposed in the power transmission path 30. However, the disclosure is not limited thereto, and the transmission mechanism may be an automatic transmission of a planetary gear type or a parallel shaft type. Further, the forward clutch 24 may be a friction clutch or a meshing clutch. Furthermore, in the embodiment illustrated in FIG. 11, the injector 42 is controlled to be in the fuel cutoff state after the disengagement of the forward clutch 24. However, the disclosure is not limited thereto, and the injector 42 may be controlled to be in the fuel cutoff state before the disengagement of the forward clutch 24.

In the embodiment illustrated in FIG. 11 or FIG. 13, the engine torque and the motor torque (power running torque, power generation torque) are continuously changed over the shift period Tt, but the disclosure is not limited thereto. For example, at any timing within the shift period Tt, the engine torque may be decreased and the power running torque of the motor generator 15 may be increased. Even in this case, the engine torque can be decreased and the power running torque can be increased under the engagement state of the forward clutch 24, and thus a shock can be reduced at the time of disengaging the forward clutch 24. That is, at the time of switching from the HEV mode to the EV mode, the control system 60 allows the engagement of the forward clutch 24 over the shift period Tt. Under the state where the forward clutch 24 is engaged, the control system 60 decreases the torque of the engine 12 and increases the power running torque of the motor generator 15.

In the above description, the shift period Tt is set based on the transmission gear ratio, the vehicle acceleration rate and the engine torque, but the disclosure is not limited thereto. For example, the shift period Tt may be set based on the transmission gear ratio alone, the shift period Tt may be set based on the transmission gear ratio and the vehicle acceleration rate, or the shift period Tt may be set based on the transmission gear ratio and the engine torque. In addition, the shift period Tt may be set based on at least any one of the transmission gear ratio, the vehicle acceleration rate and the engine torque. Further, in the examples illustrated in FIGS. 8 to 10, each of time periods T1 to T3 forming the shift period Tt is set to be continuously varied. However, the disclosure is not limited thereto and each of periods T1 to T3 may be set to be discretely varied Furthermore, in the above description, the shift period Tt is calculated by adding up the time periods T1 to T3, but the disclosure is not limited thereto. For example, factors may be set based on the transmission gear ratio, the vehicle acceleration rate and the engine torque, and the shift period Tt may be calculated by multiplying a basic period by the factors.

The vehicle control apparatus according to the disclosure controls, upon switching from the first traveling mode to the second traveling mode, the clutch mechanism to be in a state where the clutch mechanism is engaged for an entirety of the shift period, and under the state of the engagement of the clutch mechanism, the vehicle control apparatus decreases the torque of the engine and increases the power running torque of the motor generator. This can reduce a shock at the time of switching of the traveling modes.

The invention claimed is:

1. A vehicle control apparatus configured to control a vehicle, the vehicle control apparatus comprising:
   a motor generator coupled to a first drive wheel;

an engine coupled to at least one of the first drive wheel and a second drive wheel via a power transmission path;

a transmission mechanism disposed in the power transmission path;

a clutch mechanism disposed in the power transmission path between the engine and the transmission mechanism; and a control system comprising a processor and a memory communicably coupled to each other and configured to control the motor generator, the engine, the transmission mechanism and the clutch mechanism, wherein the control system has:
- a first traveling mode to control the clutch mechanism to be in an engagement state, control the engine to be in a driving state, control the motor generator to be in a rotation state, and the vehicle to be in a hybrid electric vehicle mode; and
- a second traveling mode to control the clutch mechanism to be in a disengagement state, control the engine to be in a stopped state, control the motor generator to be in the rotation state, and the vehicle to be in an electric vehicle mode, and wherein the control system is configured to set a shift period based on a transmission gear ratio of the transmission mechanism, and wherein the control system is configured to:
- control, upon switching from the first traveling mode to the second traveling mode, the clutch mechanism to be in a state where the clutch mechanism is engaged for an entirety of the shift period; and
- under the state where the clutch mechanism is engaged, decrease a torque of the engine and increase a power running torque of the motor generator.

2. The vehicle control apparatus according to claim 1, wherein the control system sets the shift period longer as the transmission gear ratio of the transmission mechanism goes to a low side.

3. The vehicle control apparatus according to claim 1, wherein the control system sets the shift period longer as an absolute value of a vehicle acceleration rate becomes smaller.

4. The vehicle control apparatus according to claim 2, wherein the control system sets the shift period longer as an absolute value of a vehicle acceleration rate becomes smaller.

5. The vehicle control apparatus according to claim 1, wherein the control system sets the shift period longer as the torque of the engine becomes larger.

6. The vehicle control apparatus according to claim 2, wherein the control system sets the shift period longer as the torque of the engine becomes larger.

7. The vehicle control apparatus according to claim 3, wherein the control system sets the shift period longer as the torque of the engine becomes larger.

8. The vehicle control apparatus according to claim 4, wherein the control system sets the shift period longer as the torque of the engine becomes larger.

9. The vehicle control apparatus according to claim 1, wherein the first traveling mode is a traveling mode, in which the clutch mechanism is controlled to be in the engagement state, the engine is controlled to be in the driving state, and the motor generator is controlled to be in a power generation state.

10. The vehicle control apparatus according to claim 2, wherein the first traveling mode is a traveling mode, in which the clutch mechanism is controlled to be in the engagement state, the engine is controlled to be in the driving state, and the motor generator is controlled to be in a power generation state.

11. The vehicle control apparatus according to claim 3, wherein the first traveling mode is a traveling mode, in which the clutch mechanism is controlled to be in the engagement state, the engine is controlled to be in the driving state, and the motor generator is controlled to be in a power generation state.

12. The vehicle control apparatus according to claim 4, wherein the first traveling mode is a traveling mode, in which the clutch mechanism is controlled to be in the engagement state, the engine is controlled to be in the driving state, and the motor generator is controlled to be in a power generation state.

13. The vehicle control apparatus according to claim 5, wherein the first traveling mode is a traveling mode, in which the clutch mechanism is controlled to be in the engagement state, the engine is controlled to be in the driving state, and the motor generator is controlled to be in a power generation state.

14. The vehicle control apparatus according to claim 6, wherein the first traveling mode is a traveling mode, in which the clutch mechanism is controlled to be in the engagement state, the engine is controlled to be in the driving state, and the motor generator is controlled to be in a power generation state.

15. The vehicle control apparatus according to claim 7, wherein the first traveling mode is a traveling mode, in which the clutch mechanism is controlled to be in the engagement state, the engine is controlled to be in the driving state, and the motor generator is controlled to be in a power generation state.

16. The vehicle control apparatus according to claim 8, wherein the first traveling mode is a traveling mode, in which the clutch mechanism is controlled to be in the engagement state, the engine is controlled to be in the driving state, and the motor generator is controlled to be in a power generation state.

* * * * *